United States Patent [19]

Santandrea et al.

[11] Patent Number: 5,145,052
[45] Date of Patent: Sep. 8, 1992

[54] APPARATUS FOR SUBSTANTIALLY SIMULTANEOUSLY PROCESSING MULTIPLE ELECTRIC MOTOR PARTS

[75] Inventors: Luciano Santandrea; Massimo Lombardi, both of Florence, Italy

[73] Assignee: Axis USA, Inc., Marlborough, Mass.

[21] Appl. No.: 683,049

[22] Filed: Apr. 10, 1991

[51] Int. Cl.[5] ............................................. B65G 47/86
[52] U.S. Cl. ................................. 198/468.2; 414/736; 198/346.2; 29/732
[58] Field of Search .................... 198/346.2, 468.2; 29/596, 732, 736; 414/736, 783

[56] References Cited

U.S. PATENT DOCUMENTS

| | | | |
|---|---|---|---|
| 1,909,813 | 5/1933 | Crosbie | 414/736 |
| 3,468,435 | 9/1969 | Ellwanger et al. | 198/468.2 X |
| 3,878,602 | 4/1975 | Schubert et al. | 29/598 |
| 3,924,816 | 12/1975 | Schubert et al. | 242/7.05 B |
| 4,505,636 | 3/1985 | Sugino et al. | 414/736 |
| 4,571,813 | 2/1986 | Fukuoka et al. | 414/736 X |
| 4,974,313 | 12/1990 | Reiger, Jr. | 29/736 |

FOREIGN PATENT DOCUMENTS

| | | | |
|---|---|---|---|
| 0123653 | 5/1988 | Japan | 414/736 |
| 0835898 | 6/1981 | U.S.S.R. | 198/346.2 |
| 1283089 | 1/1987 | U.S.S.R. | 414/736 |
| 1315227 | 6/1987 | U.S.S.R. | 414/736 |

OTHER PUBLICATIONS

"The Aumann Production Line AFS for Manufacturing Armatures for Universal Motors", Willy Aumann KG, Espelkamp, Germany, 1987.
"The Aumann Production-Systems; Armature Winding Machines AEW, ADW", Willy Aumann KG, Espelkamp, Germany, 1988.

*Primary Examiner*—Robert P. Olszewski
*Assistant Examiner*—James R. Bidwell
*Attorney, Agent, or Firm*—Robert R. Jackson; Eric C. Woglom

[57] ABSTRACT

Multiple electric motor parts are processed simultaneously by apparatus which removes the parts from a conveyor (on which the parts are side by side in a substantially horizontal plane), repositions the parts so that they are vertically above one another, processes the parts while they are thus repositioned, and then returns the parts to the conveyor in their original side by side relationship in a horizontal plane.

20 Claims, 9 Drawing Sheets

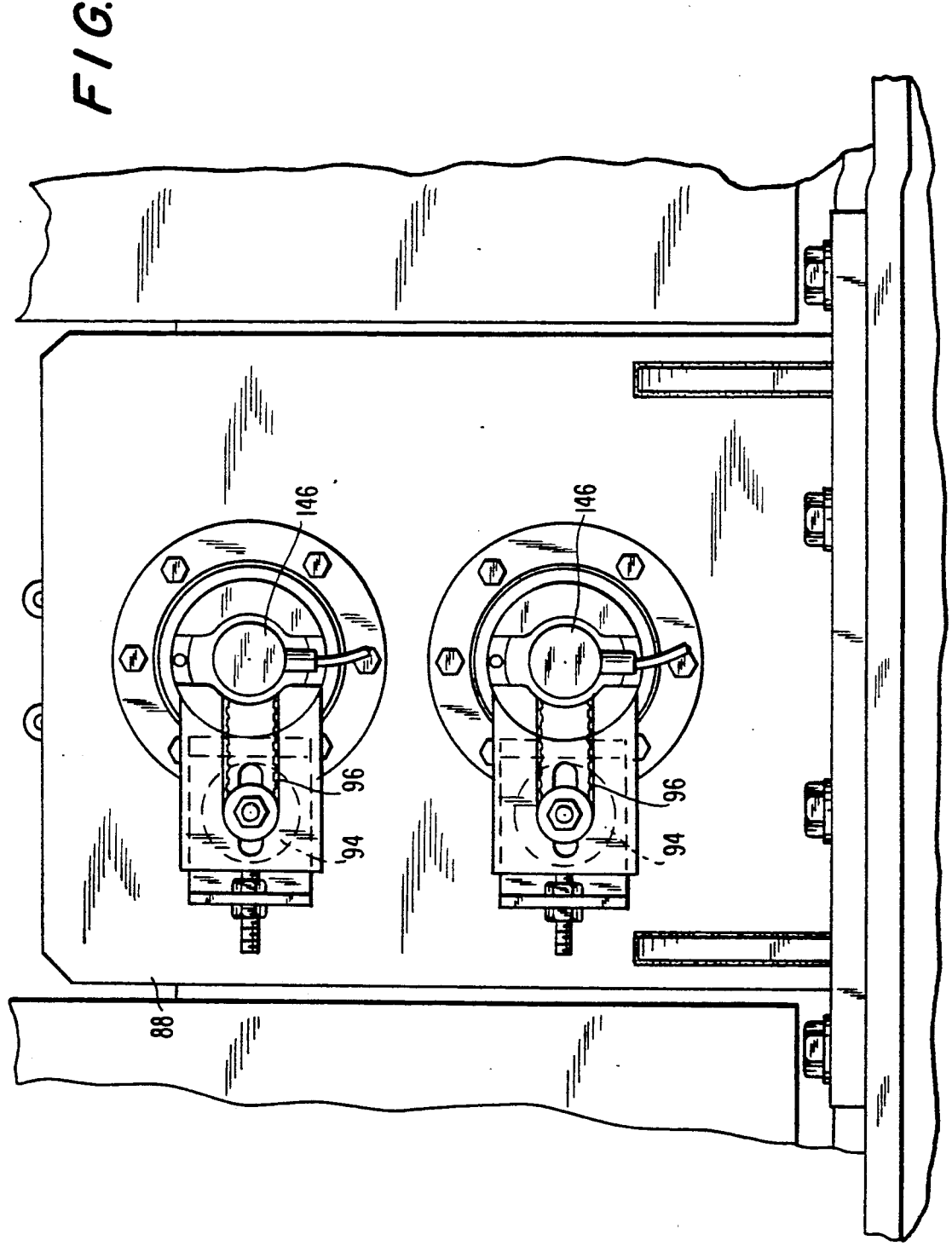

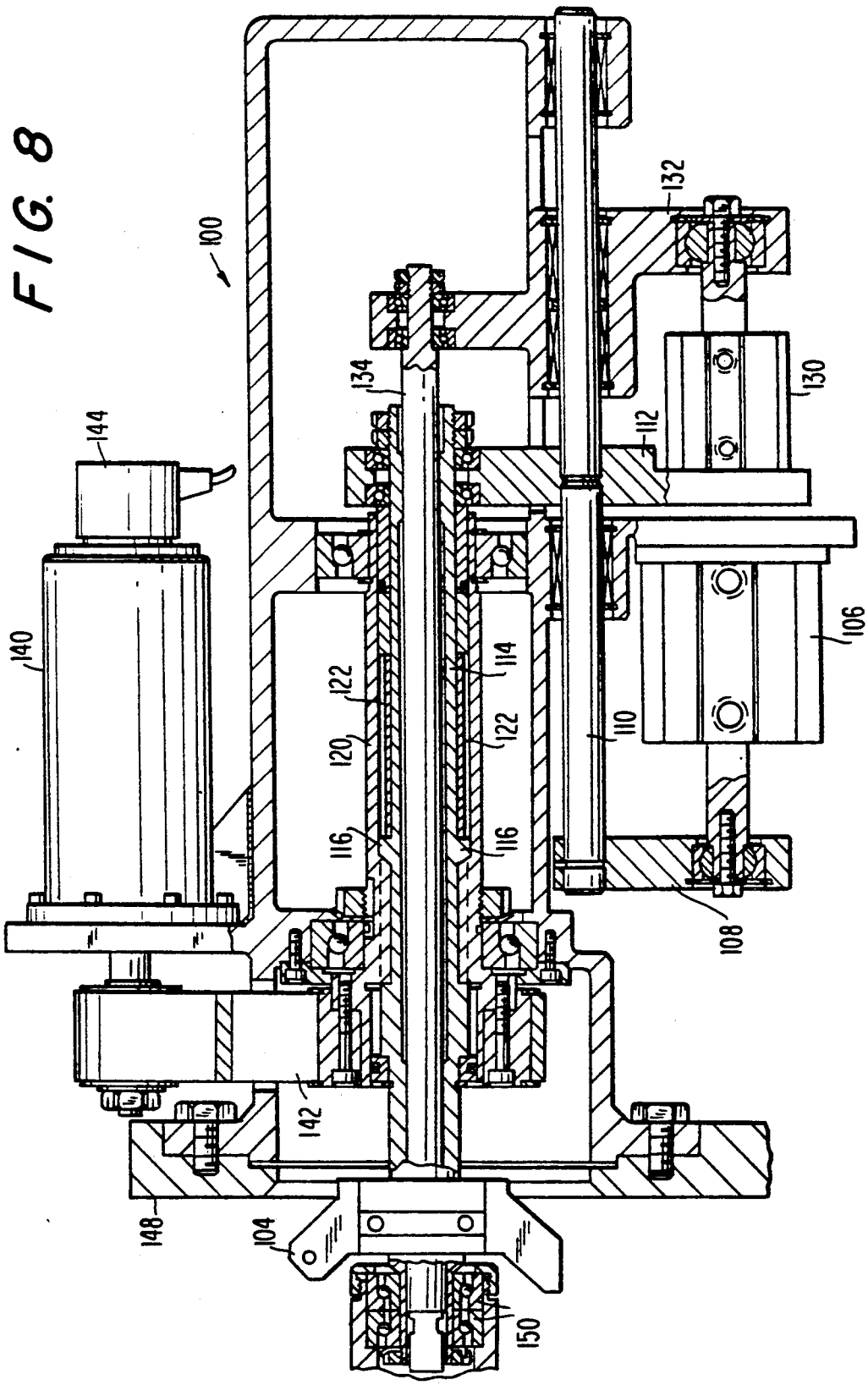

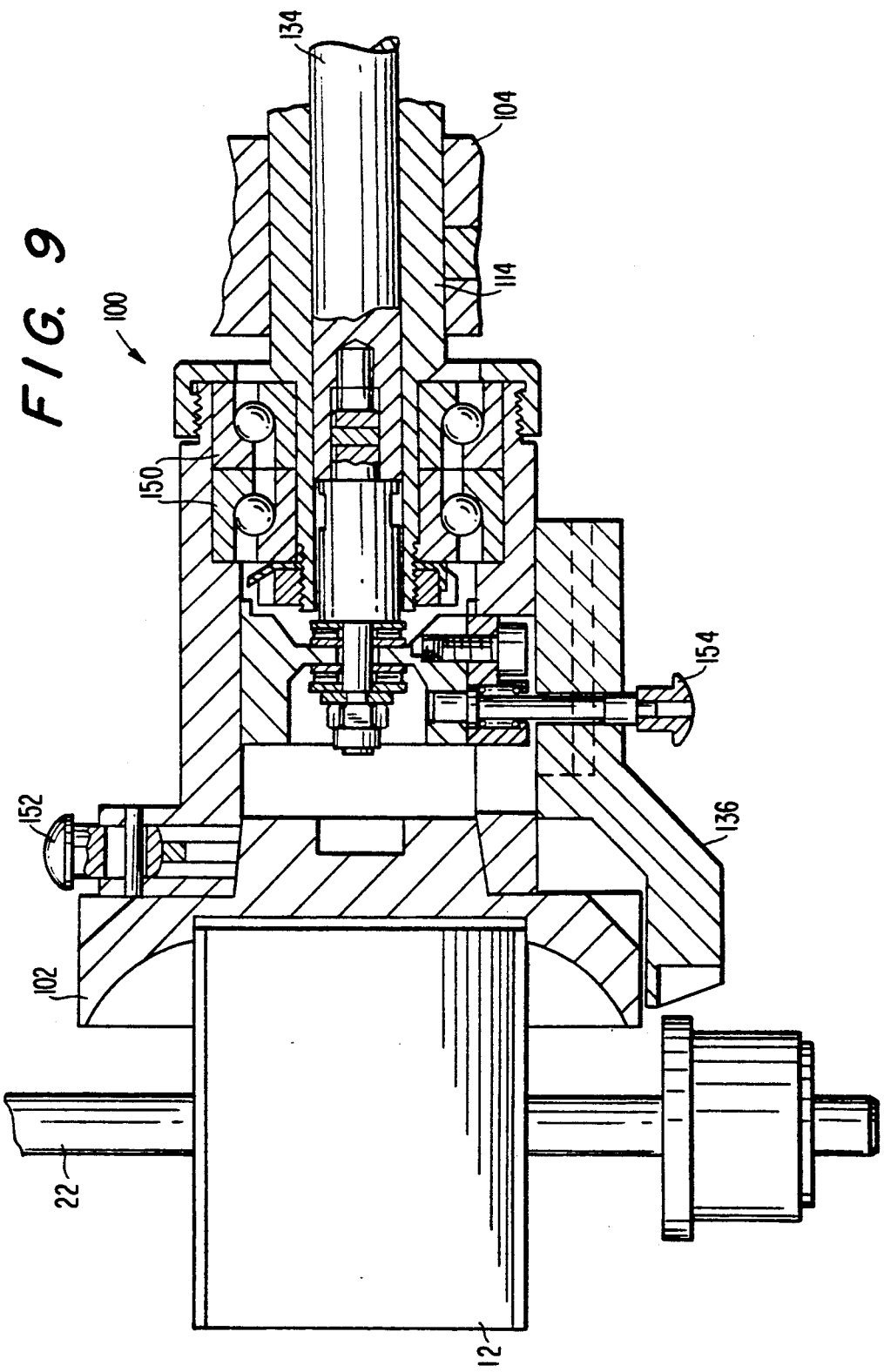

APPARATUS FOR SUBSTANTIALLY SIMULTANEOUSLY PROCESSING MULTIPLE ELECTRIC MOTOR PARTS

BACKGROUND OF THE INVENTION

This invention relates to electric motor manufacturing equipment, and more particularly to electric motor manufacturing equipment which is capable of simultaneously processing two or more electric motor parts.

There is increasing interest among electric motor manufacturers in electric motor manufacturing equipment which can be set up to process two or more different types of electric motor parts in a single production run (so-called mixed production). There is also increasing interest in equipment which achieves greater throughput by processing two or more parts simultaneously or substantially simultaneously. On the other hand, it is not desirable to increase the floor space occupied by the equipment because this increases space cost, increases the cost of whatever conveyor apparatus is used to carry parts throughout the system, increases parts travel time throughout the system, makes the system more difficult to observe, etc.

It is therefore an object of this invention to provide improved apparatus for simultaneously processing multiple electric motor parts.

It is another object of this invention to provide apparatus for simultaneously processing multiple electric motor parts which may be the same or different, and which can be easily changed from time to time.

It is still another object of this invention to provide apparatus for simultaneously processing multiple electric motor parts without substantially increasing the floor space or conveyor run length required to similarly process electric motor parts one at a time.

SUMMARY OF THE INVENTION

These and other objects of the invention are accomplished in accordance with the principles of the invention by providing apparatus in which multiple electric motor parts are processed one above the other in at least some of the processing stations. The parts are conveyed between stations substantially side by side in a substantially horizontal plane. At a processing station, however, two or more parts are removed from the conveyor and repositioned so that they are vertically above one another. In that relative position, the two or more parts are processed substantially simultaneously by vertically adjacent processors. Thereafter, the processed parts are returned to the conveyor in a horizontal side by side relationship which is the same as or similar to their original relationship.

Because the multiple motor parts are processed while vertically above one another, the apparatus of this invention does not take up substantially more floor space than prior art apparatus. Conveyor runs are also not substantially increased in length. If desired, the individual processors may be mounted and/or constructed to facilitate easy and individual change for either partial or complete conversion of the apparatus to different types of parts. This facilitates all kinds of production changes, including mixed production.

Further features of the invention, its nature and various advantages will be more apparent from the accompanying drawings and the following detailed description of the preferred embodiments.

BRIEF DESCRIPTION OF THE DRAWINGS

FIG. 7 is a partial elevational view taken along the line 7—7 in FIG. 2.

FIG. 8 is a partial sectional view taken along the line 8—8 in FIG. 2.

FIG. 9 is a partial sectional view taken along the line 9—9 in FIG. 2, with the addition of an armature in place for processing. FIG. 9 shows elements broken off in FIG. 8, albeit at a different scale and from a different direction.

DETAILED DESCRIPTION OF THE PREFERRED EMBODIMENTS

Although the principles of this invention are equally applicable to processing other types of electric motor parts such as stators, and to performing processing steps other than coil winding, the invention will be fully understood from the following description of an illustrative embodiment of apparatus for winding coils on electric motor armatures. Similarly, although palletized conveyance of the armatures is employed in the depicted illustrative embodiment, it will be understood that other types of parts conveyance can be used instead if desired.

Figure 1:
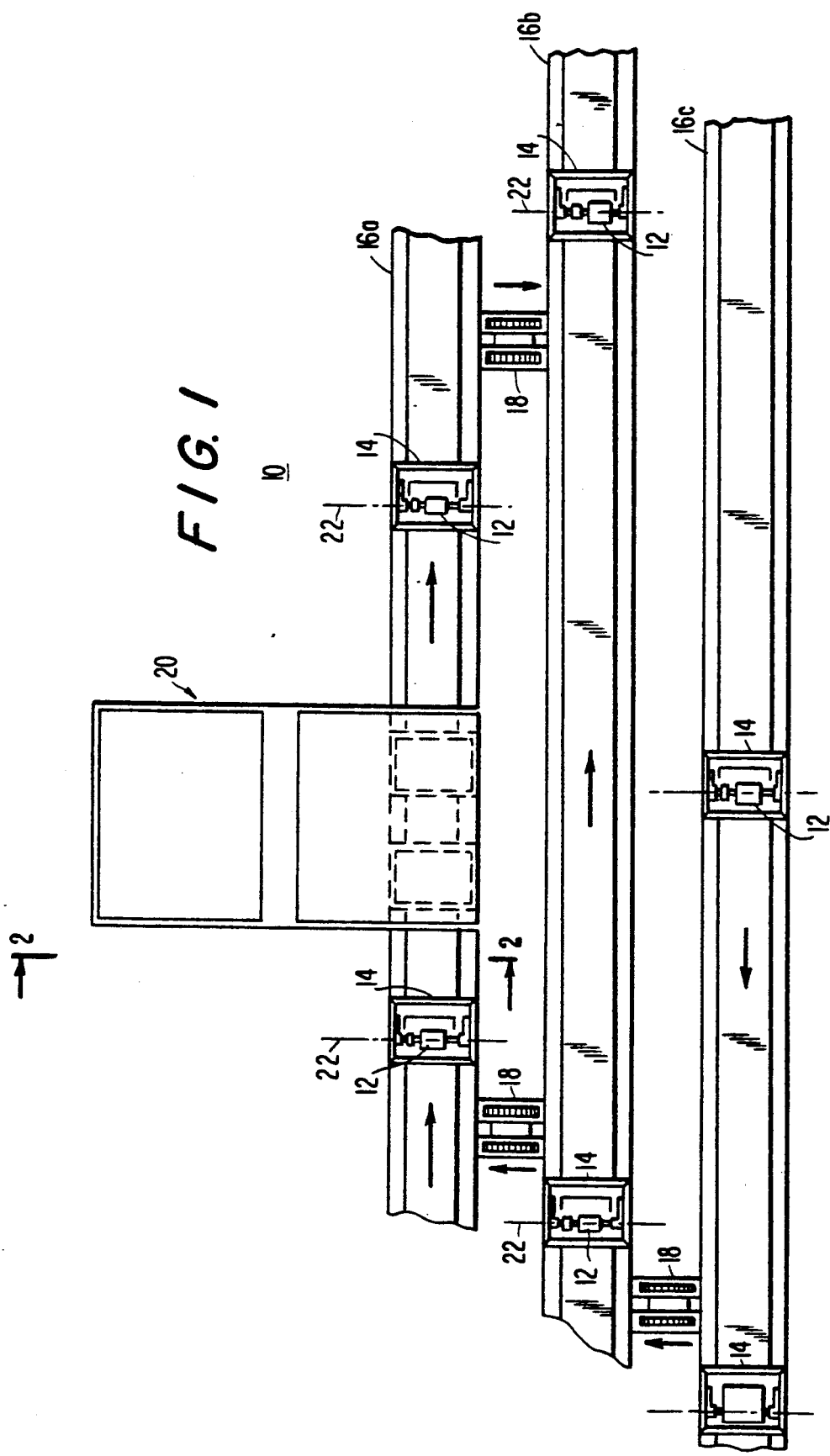
FIG. 1 is a simplified plan view of illustrative apparatus which employs the principles of this invention.

As shown in FIG. 1, in illustrative armature processing line 10, armatures 12 are conveyed on pallets 14 on several parallel conveyor lines 16a, 16b, and 16c. For example, pallets bearing armatures for winding may be conveyed to and from armature winding station 20 from left to right as viewed in FIG. 1 on conveyor 16a. Conveyor 16b, travelling in the same direction as conveyor 16a, allows armatures to bypass winding station 20 (e.g., in order to get to or from other winding stations which are not shown in the drawing). Conveyor 16c, travelling in the opposite direction, returns empty pallets to the start of the line for reloading. Armatures which have not been fully processed (e.g., because the processing equipment appropriate for that type of armature was temporarily out of service or too busy) may also be moved back upstream via conveyor 16c. Inter-conveyor transfer devices 18 are located between adjacent conveyors for transferring pallets from conveyor to conveyor as desired.

Note that the armatures are conveyed to and from winding station 20 substantially side by side in a substantially horizontal plane. This just means that the armatures are horizontally adjacent to one another while on the conveyor. Although in the depicted preferred embodiment the longitudinal axes 22 of the armatures are parallel to one another and horizontal, the armatures could be oriented differently on the pallets (e.g., with axes 22 aligned, or with axes 22 vertical and parallel) and they would still be substantially side by side in a substantially horizontal plane as that phrase is employed herein.

Although (as has been mentioned) any other type of armature conveyance could be used instead, in the depicted preferred embodiment armatures 12 are conveyed on pallets 14 of the general type shown in U.S. Pat. No. 5,060,781 commonly assigned, co-pending U.S. patent application Ser. No. 326,158, filed Mar. 20, 1989 (Docket AX/009 CIP), and U.S. Pat. No. 5,060,780. In particular, each pallet 14 has an open rectangular base 24 (see also FIGS. 2-4) on which are mounted supports 26a and 26b for supporting the respective opposite ends of an armature shaft. The spacing between supports 26a and 26b is adjustable to facilitate adapting the line for processing different armature sizes, either at different times or at the same time, as desired. To illustrate this point it will be noted that two different sizes of armatures are shown being processed simultaneously in the drawings. Each pallet 14 may carry a coding device 28 (FIG. 2) which indicates the type of armature being carried by that pallet, and also possibly the status of the processing of the armature on that pallet. This coding device is read (and also possibly updated) by readers 30 at various points throughout the processing line in order to monitor and control processing of the armatures.

As will become more apparent as the description proceeds, winding station 20 is capable of winding two armatures simultaneously. In order to do this, winding station 20 must first be supplied with two unwound armatures of the correct type (assuming that different types of armatures are being processed during a given production run). This is accomplished by the conveyor system which directs pallets carrying unwound armatures of the proper type or types to positions on conveyor 16a adjacent winding station 20 where the winding station apparatus can remove the armatures from their pallets for winding.

Figure 3:
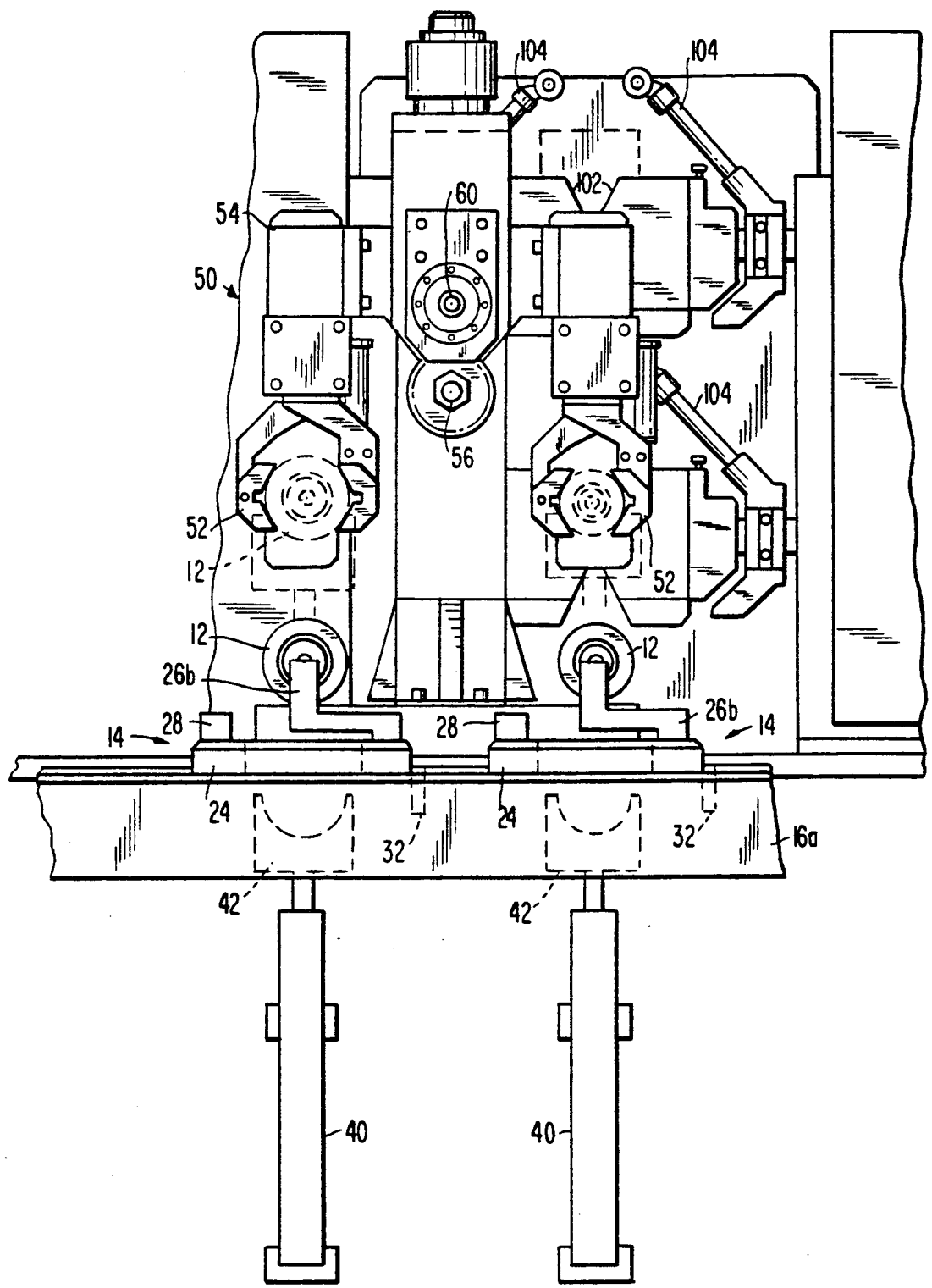
FIG. 3 is a partial elevational view taken along the line 3—3 in FIG. 2.

As shown in FIG. 3, stops 32 stop the desired pallets at the correct positions relative to winding station 20. Elevators 40 then extend upward through conveyor 16a and the open centers of pallets 14 in order to lift armatures 12 up off of supports 26 to the positions shown in dotted lines in FIG. 3. In these positions armatures 12 can be gripped by the grippers 52 of a first transfer mechanism 50. Although any other suitable grippers can be employed, particularly preferred grippers are shown in commonly assigned, concurrently filed U.S. patent application Ser. No. 683,195 (Docket AX/033). As a possible alternative to providing elevators 40 for lifting armatures 12 up off of pallets 14, transfer mechanism 50 could be constructed so that grippers 52 move down to grip the armatures and then move back to the position shown in FIG. 3.

Figure 4:
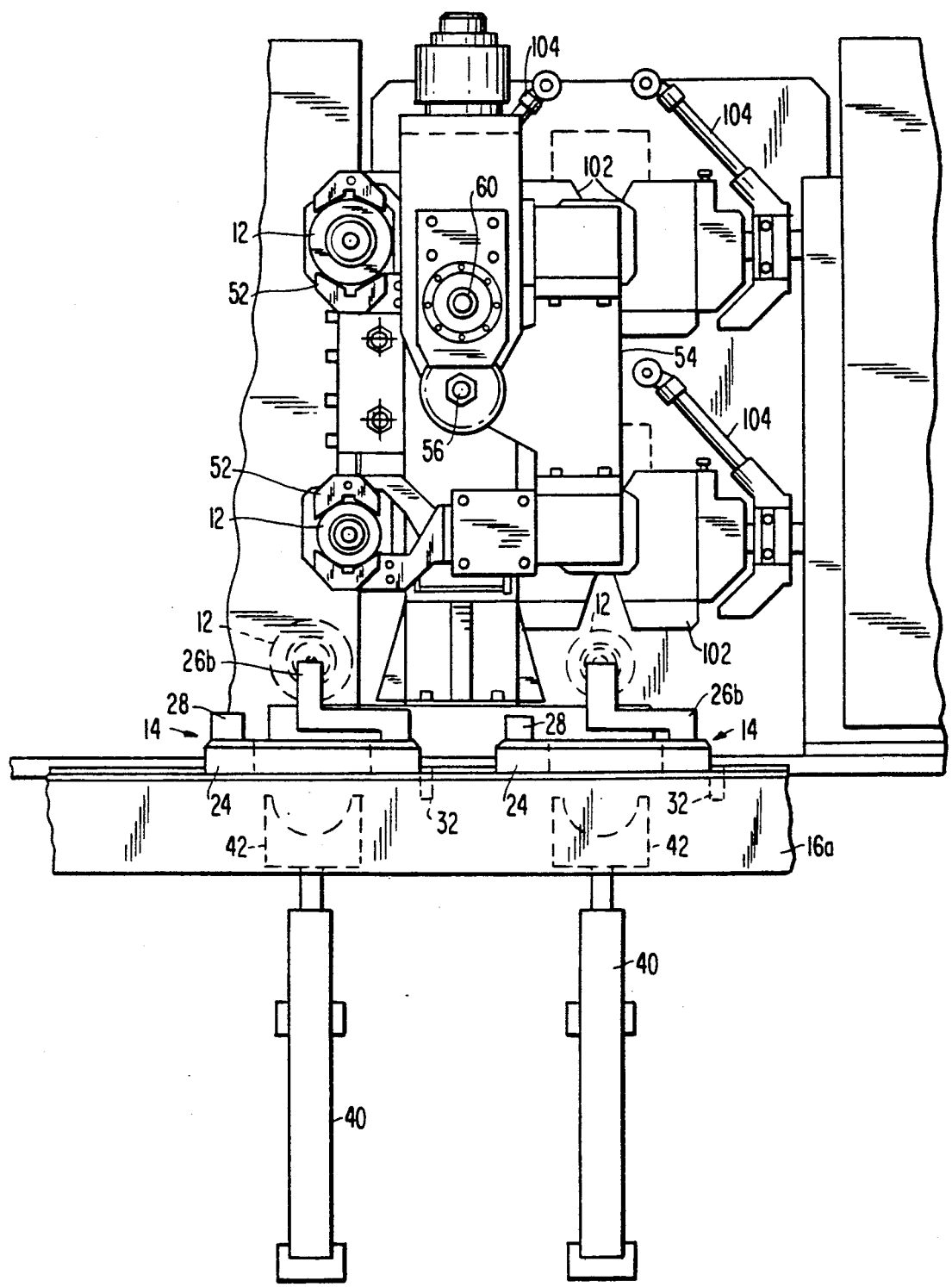
FIG. 4 is a view similar to FIG. 3 but showing the apparatus in a different operating condition.
Figure 5:
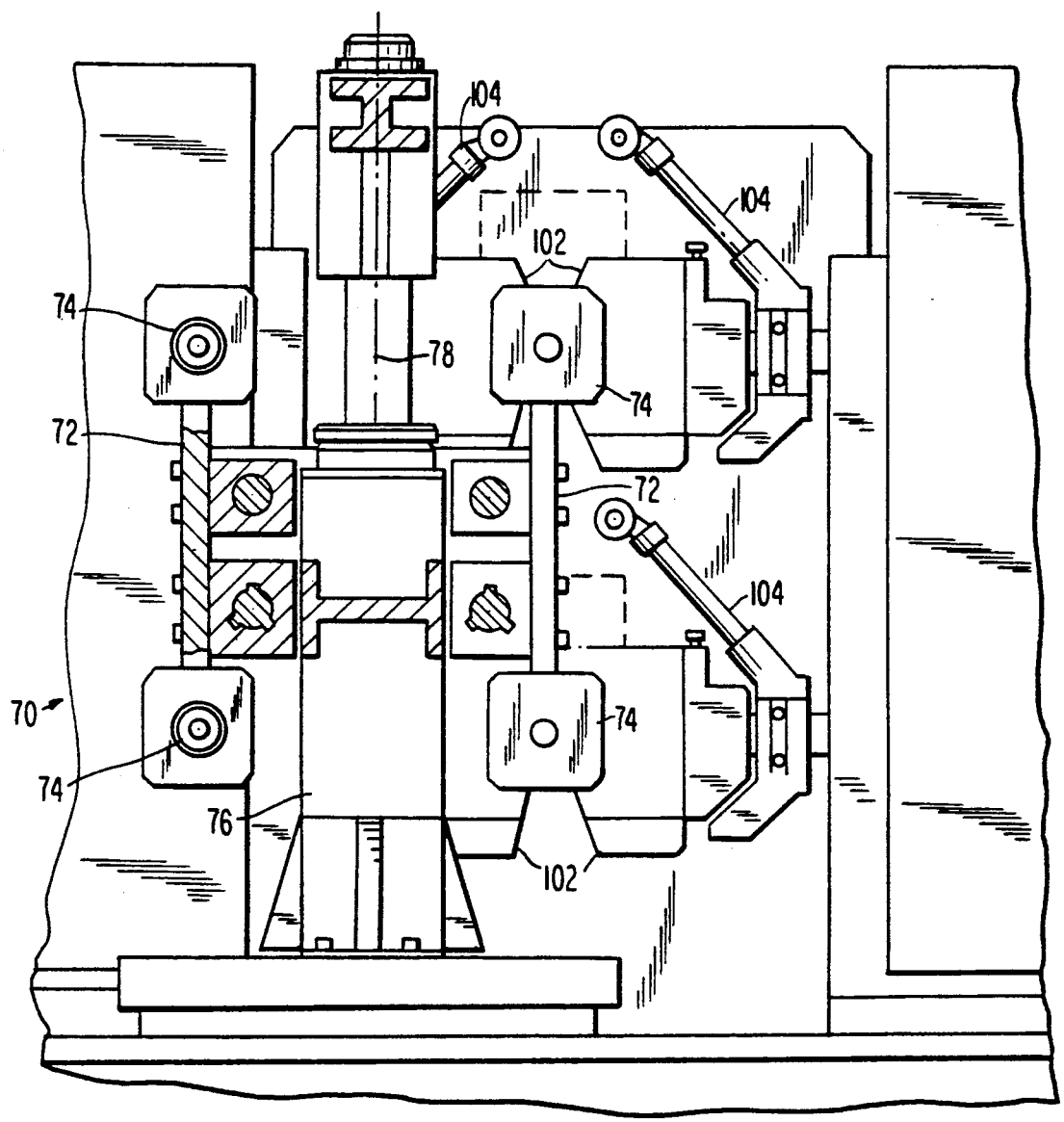
FIG. 5 is a partial sectional view taken along the line 5—5 in FIG. 2.

Returning to the depicted embodiment, when armatures 12 have been gripped by grippers 52, elevators 40 are lowered sufficiently to allow the cross arm 54 of transfer mechanism 50 to rotate 90° about axis 56 from the position shown in FIG. 3 to the position shown in FIG. 4. This rotation of cross arm 54 is accomplished by motor 58 (FIG. 2) whose shaft 60 is geared to a gear concentric with axis 56 and fixed relative to cross arm 54. Because grippers 52 are mounted on cross arm 54, the above-described 90° rotation of the cross arm repositions armatures 12 relative to one another from the horizontal side by side relationship shown in FIG. 3 to the position shown in FIG. 4 in which one armature is vertically above the other.

Figure 6:
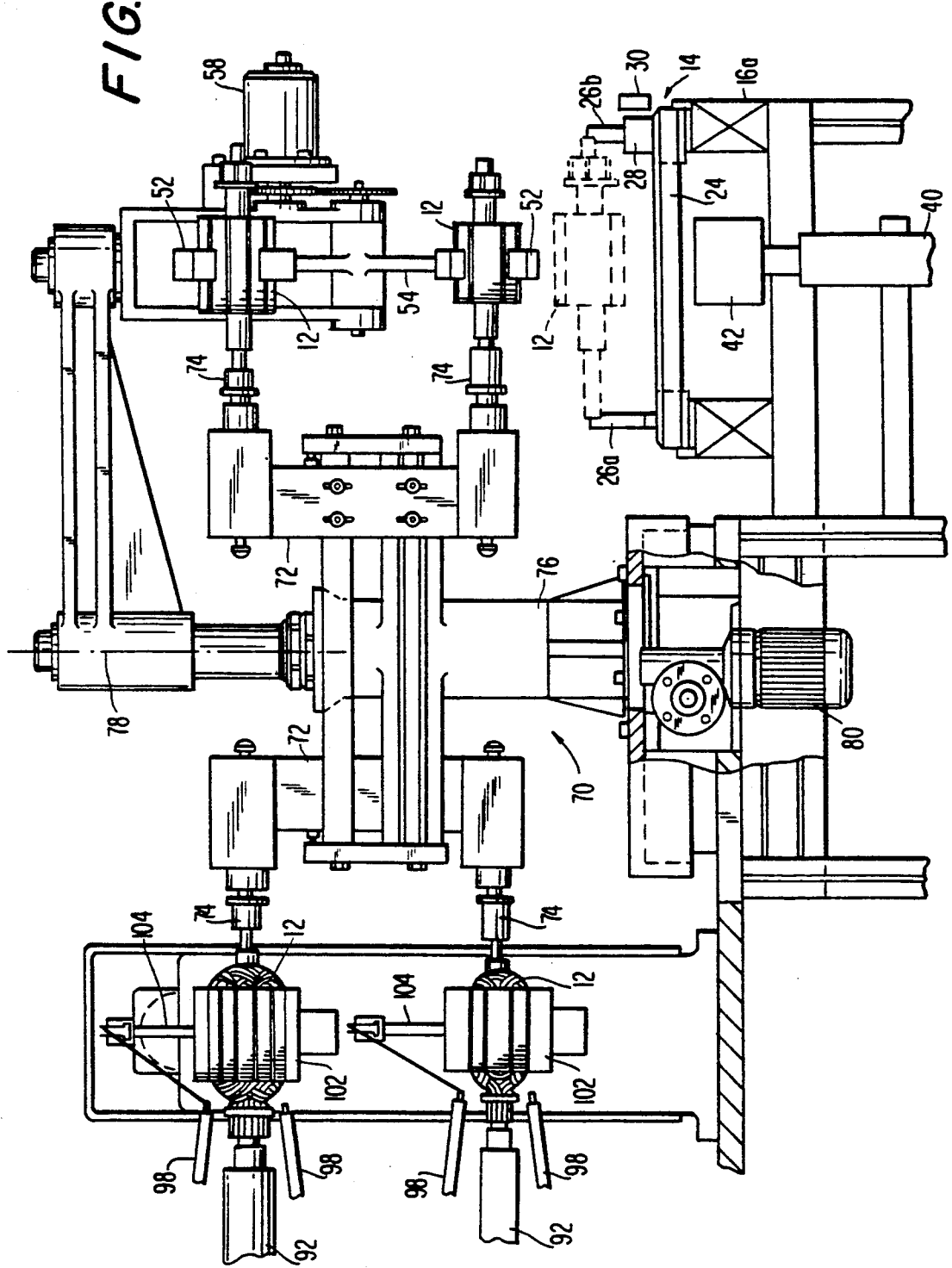
FIG. 6 is a view generally similar to a portion of FIG. 2 but showing the apparatus in a different operating condition.

After cross arm 54 has been rotated as described above, the transfer mechanism 70 cross arm 72 which is nearer the unwound armatures is moved toward those armatures so that the grippers 74 on that cross arm can grip the axial ends of the armatures (as shown FIG. 6). (Grippers 74 may be constructed as shown in commonly assigned, co-pending U.S. patent application Ser. No. 539,989, filed Jun. 18, 1990 (Docket AX/025).) Thereafter, grippers 52 release the armatures, cross arms 72 retract, and the assembly 76 carrying both of cross arms 72 rotates 180° about vertical axis 78. This rotation is accomplished by motor 80 acting through appropriate mechanical connections to assembly 76.

After the above-described 180° rotation of assembly 76, the cross arm 72 carrying the unwound armatures is again extended away from axis 78 in order to insert the remote ends of the armature shafts in collets 92 of gripping and indexing mechanisms 90. Collets 92 are then operated to grip the ends of the armature shafts thus positioned in them, after which grippers 74 can release the armatures. Collets 92 (and associated shields) may be constructed as shown in commonly assigned, co-pending U.S. patent application Ser. No. 531,843, filed May 31, 1990 (Docket AX/023) in order to facilitate rapid changing of the collet mechanisms and the associated shields without the need for dismounting assemblies 90 when different types of armatures are to be wound. The lead anchoring grippers 98 (discussed below) often do not require modification when different types of armatures are to be processed. But if such changes are required, they can also generally be effected without dismounting assemblies 90.

It will be noted that during the foregoing motion of elements 72 and 76 to transfer unwound armatures from grippers 52 to collets 92, the other cross arm 72 which is initially adjacent to collets 92 is performing exactly the same motion sequence to remove wound armatures from collets 92 and to position those armatures for gripping by grippers 52 and subsequent placement on the empty pallets 14 at stops 32 as will be described in more detail below.

Returning now to the processing of the unwound armatures, after the ends of those armatures have been gripped by collets 92, assemblies 100 (see especially the representative assembly 100 shown partly in FIG. 8 and effectively continued in FIG. 9) located adjacent each side of each armature are operated to move a winding shroud 102 and wire-winding flyer 104 sufficiently close to the armature to allow the shrouds to guide a wire from the rotating flyer into the desired pairs of slots in the armature. This is accomplished by extending the actuator 106 in each of assemblies 100 as shown in FIG. 8. Extension of actuator 106 moves plate 108, rod 110, plate 112, tube 114, and all of the elements mounted on the left-hand end of tube 114 as viewed in FIGS. 8 and 9 (e.g., shroud 102 and flyer 104) to the left. Tube 114 can reciprocate axially in this manner relative to surrounding tube 120. However, tube 114 has outwardly extending teeth 116 which extend into axial slots 122 in tube 120 so that rotation of tube 120 is always transmitted to tube 114. Plate 112 also carries hooking plate actuator 130. Accordingly, the hooking plate elements (e.g., slide 132, rod 134, and hooking plate 136 (FIG. 9)) initially move with plate 112 in response to operation of actuator 106. When desired, however, actuator 130 can be operated to move slide 132, rod 134, and hooking plate 136 relative to shroud 102 and flyer 104 as is required to guide the armature coil leads to tangs or other elements on the associated armature in order to anchor and terminate those leads.

After shrouds 102 and flyers 104 are properly positioned adjacent the armatures, the motor 140 associated with each of assemblies 100 is operated to rotate tube 120 via timing belt 142. An encoder 144 may be associated with motor 140 in order to allow closed loop control of the motion and position of the associated flyer 104. Rotation of tube 120 rotates tube 114 which in turn rotates the flyer 104 fixed to the end of that tube. Bearings 150 between tube 114 and shroud assembly 102 support the shroud assembly on the tube but allow the shroud assembly to remain relatively stationary while the tube rotates. A quick-change mechanism 152 (described in more detail in commonly assigned, co-pending U.S. patent application Ser. No. 610,928, filed Nov. 9, 1990 (Docket AX/024)) allows the actual shrouds 102 to be quickly changed to conform to different armature sizes and/or winding configurations if desired. Hooking plate 136 is connected to rod 134 so that only axial motion of the rod is transmitted to the hooking plate. Hooking plate 136 may also be attached to the elements which actuate it by a quick-change mechanism 154 to facilitate rapid change of the hooking plate when different armatures are to be processed (see again U.S. patent application Ser. No. 610,928).

After flyers 104 have wound each coil, the flyers are stopped and motors 94 (FIG. 7), acting through timing belts 96, rotationally index collets 92 and thereby armatures 12 to position new slots to receive the next coils to be wound. Once again, encoders 146 may be associated with motors 94 to allow closed loop control of the angular positions of collets 92. Flyers 104 then resume rotation to wind coils in the new slots.

When each armature is fully wound, wire grippers 98 cut and hold the wire extending from each associated flyer 104.

The fully wound armatures are now ready for return to pallets 14 on conveyor 16a. Accordingly, assemblies 100 are retracted by retraction of actuators 106 (FIG. 8), and grippers 74 are operated to grip the ends of the armature shafts remote from collets 92. Collets 92 are then operated to release the armatures, and grippers 74 are moved to withdraw the armatures from the collets. Thereafter, the above-described 180° rotation of assembly 76 about axis 78, followed by outward movement of cross arms 72, positions the wound armatures for engagement by grippers 52. (These same motions of the components of transfer mechanism 70 position new unwound armatures for engagement by collets 92 as has already been described.) Grippers 52 are then operated to grip the wound armatures, which can now be released by grippers 74. Cross arm 54 is rotated back to the horizontal position shown in FIG. 3, and elevators 40 are again raised. When elevators 40 are ready to support the armatures, grippers 52 are operated to release the armatures. Elevators 40 are then lowered to place the wound armatures back on the pallets adjacent winding station 20. Conveyor 16a can then convey these pallets away and bring in new pallets bearing armatures which have yet to be wound.

The depicted system has many features which facilitate rapid total or partial change-over from processing one type of armature to processing a different type of armature. The adjustability of pallets 14 has already been mentioned. As another example, the cradle 42 at the top of each elevator 40 can be changed to engage different armature sizes, and to ensure that for any given armature size, the armature is properly positioned for engagement by a gripper 52 at the top of the elevator stroke. Each of grippers 52 can be readily changed to grip different armature sizes, and to ensure that for any given armature size, the armature is properly positioned for transfer to the associated gripper 74 when cross arm 54 is in the vertical position. Grippers 74 can also be readily changed to grip different armature sizes, and to ensure that for any given armature size, the armature is properly positioned for engagement by the associated collet 92 when cross arms 72 are in their outer positions. Assemblies 90 are individually flanged to support 88 so that each assembly can be easily removed and replaced as a unit. This facilitates off-line maintenance and repair of assemblies 90. Other respects in which winding station 20 can be easily altered are the above-described construction of collets 92 and associated shields to facilitate rapid changing of those elements, and the quick-change mounting of shrouds 102 and hooking plates 136, also described above.

Figure 2:
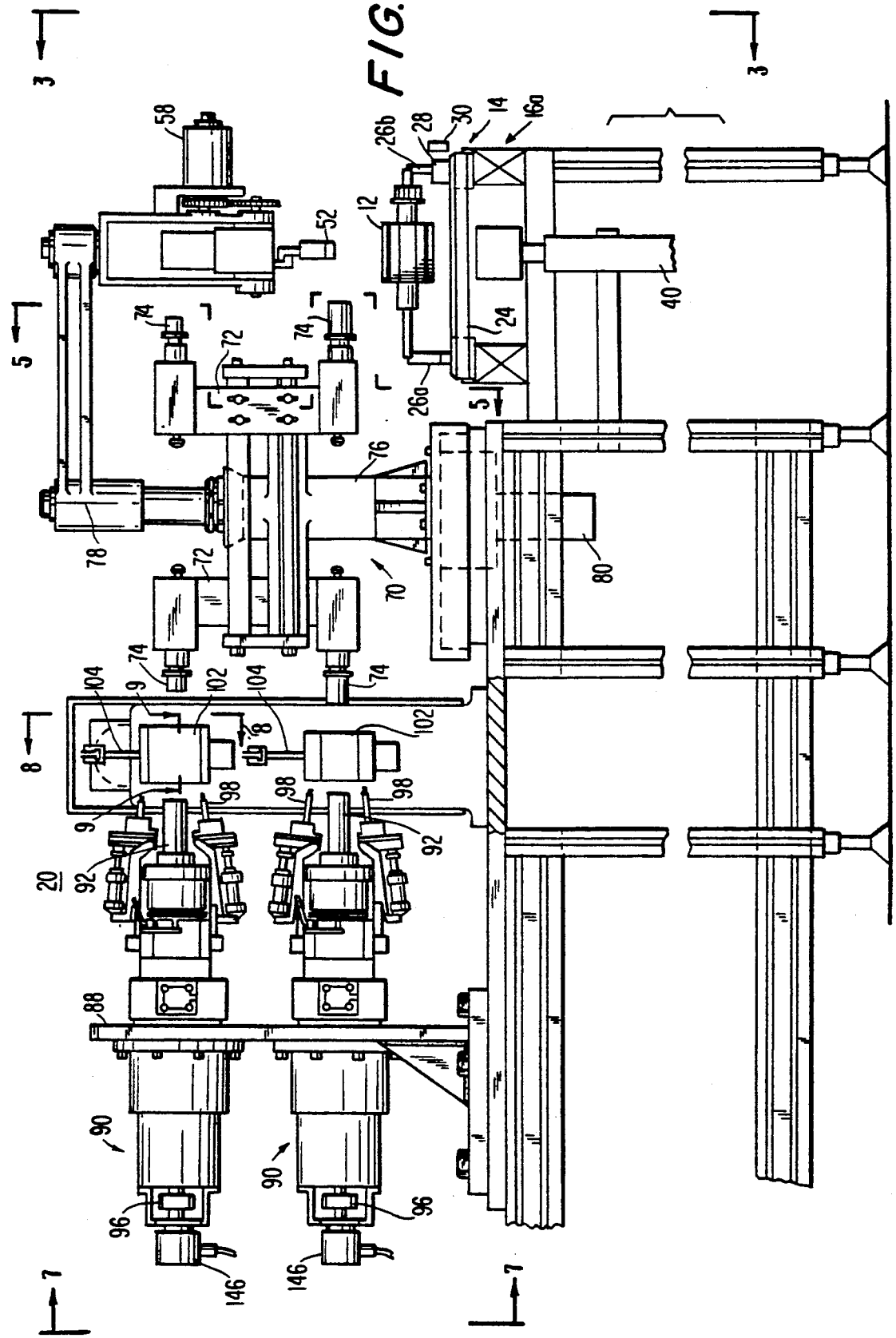
FIG. 2 is an elevational view taken generally along the line 2—2 in FIG. 1 but with some parts removed for clarity.

In addition to the advantages discussed above, the cost of machines constructed in accordance with this invention tends to be reduced by several factors such as the following. Only one base is required even though two or more motor parts are being processed above that base. Moreover, this base may be relatively small. If desired, both or all of assemblies 90 can be mounted in a single low-cost casting rather than being flanged to plate 88 as shown in FIG. 2. Similarly, both or all of assemblies 100 could be mounted in a single low-cost casting rather than being flanged to plate 148 as shown in FIG. 8. If the machine is set up to process multiple armatures of the same type, then both or all of collet mechanisms 92 can be rotated by using one motor with belt transmission to the various shafts in order to control the shafts simultaneously for the same angular motions. With only one motor, only one control is required, which can be an encoder coupled to the end of one of the collet shafts. In addition, both or all collets can be actuated by a single actuator (e.g., of the type shown at 170 in FIG. 9 of above-mentioned U.S. patent application Ser. No. 531,843). Similarly, when the armatures being processed are all the same, the flyers 104 on each side of the armatures can be rotated using a single motor with belt transmission to the various shafts. Again, with only one motor, only one encoder is required for control of that motor. Still further, when only one type of armature is being processed, the reciprocating motion of the flyers 104, shrouds 102, etc., can be controlled by a single actuator 106 (e.g., by extending plate 108 of the assembly which includes the actuator to the other assembly). The same technique can be used to avoid duplication of actuators 130.

It will be understood that the foregoing is merely illustrative of the principles of this invention, and that various modifications can be made by those skilled in the art without departing from the scope and spirit of the invention. For example, although the two armatures to be processed simultaneously by the depicted winding station are conveyed to and from the winding station on separate pallets, both armatures could be conveyed side by side on a single pallet if desired.

The invention claimed is:

1. Apparatus for processing a plurality of electric motor parts comprising:
    means for conveying said motor parts substantially side by side in a substantially horizontal plane;

means for removing at least two of said motor parts from said means for conveying and for rotating said at least two motor parts relative to one another so that they become substantially side by side in a substantially vertical plane, with one of said at least two motor parts being vertically above the other of said at least two motor parts in said substantially vertical plane;

means for substantially simultaneously processing said at least two motor parts while they are substantially side by side in said substantially vertical plane; and means for returning said at least two motor parts to said means for conveying after processing by said means for processing, said at least two motor parts being returned to said means for conveying so that they are again substantially side by side in a substantially horizontal plane.

2. The apparatus defined in claim 1 wherein said means for removing comprises:
   a longitudinal member having a longitudinal axis;
   first and second motor part gripper means mounted on said longitudinal member so that said first and second gripper means are spaced from one another longitudinally along said longitudinal axis, each of said gripper means being adapted to releasably grip a respective one of said at least two motor parts; and
   means for rotating said longitudinal member about a substantially horizontal axis which is substantially perpendicular to said longitudinal axis.

3. The apparatus defined in claim 2 wherein said means for rotating rotates said longitudinal member from a first position in which said longitudinal axis is substantially horizontal to a second position in which said longitudinal axis is substantially vertical.

4. The apparatus defined in claim 3 wherein said means for removing further comprises:
   means for substantially simultaneously raising said at least two motor parts from said means for conveying, said means for raising positioning said at least two motor parts for gripping respectively by said first and second gripper means when said longitudinal axis is substantially horizontal.

5. The apparatus defined in claim 3 wherein said means for processing comprises:
   third and fourth motor part gripper means for respectively releasably gripping said at least two motor parts while said motor parts are also gripped by said first and second gripper means and said longitudinal axis is substantially vertical; and
   means for rotating said third and fourth gripper means about a substantially vertical axis after said first and second gripper means have released said motor parts in order to move said motor parts away from said first and second gripper means.

6. The apparatus defined in claim 5 wherein said means for processing further comprises:
   means for moving said third and fourth gripper means substantially horizontally in order to withdraw said motor parts from said first and second gripper means prior to operation of said means for rotating said third and fourth gripper means.

7. The apparatus defined in claim 5 wherein said means for processing further comprises:
   fifth and sixth motor part gripper means for respectively releasably gripping said at least two motor parts while said motor parts are also gripped by said third and fourth gripper means and after said means for rotating said third and fourth gripper means has moved said motor parts away from said first and second gripper means.

8. The apparatus defined in claim 7 wherein said means for processing further comprises:
   means for moving said third and fourth gripper means substantially horizontally in order to insert said motor parts in said fifth and sixth gripper means after operation of said means for rotating said third and fourth gripper means.

9. The apparatus defined in claim 7 wherein said means for processing further comprises:
   first and second means for respectively operating on said at least two motor parts while said motor parts are gripped by said fifth and sixth gripper means in order to modify said at least two motor parts.

10. The apparatus defined in claim 9 wherein said first and second means for respectively operating are vertically spaced from one another.

11. The apparatus defined in claim 1 wherein said means for conveying comprises:
    a plurality of pallets, each of which is adapted to support at least one of said motor parts; and
    means for moving said pallets in a substantially horizontal plane adjacent to said means for removing and said means for returning.

12. The method of processing a plurality of electric motor parts comprising the steps of:
    conveying said motor parts substantially side by side in a substantially horizontal plane;
    removing at least two of said motor parts from said horizontal plane and rotating said at least two motor parts relative to one another so that they become substantially side by side in a substantially vertical plane, with one of said at least two motor parts being vertically above the other of said at least two motor parts in said substantially vertical plane;
    substantially simultaneously processing said at least two motor parts while they are substantially side by side in said substantially vertical plane; and
    returning said at least two motor parts to a substantially horizontal plane after said processing step so that said at least two motor parts are again substantially side by side in said substantially horizontal plane.

13. The method defined in claim 12 wherein said removing step comprises the steps of:
    releasably gripping each of said at least two motor parts with a respective one of a plurality of first grippers; and
    rotating said plurality of first grippers as a unit about a substantially horizontal axis which is substantially perpendicular to an axis passing through said at least two motor parts.

14. The method defined in claim 13 wherein said first grippers are initially horizontally spaced from one another, and wherein said first grippers become vertically spaced from one another as a result of said rotating step.

15. The method defined in claim 13 wherein said first grippers grip said at least two motor parts substantially simultaneously.

16. The method defined in claim 14 wherein said processing step comprises the steps of:
    releasably gripping each of said at least two motor parts with a respective one of a plurality of vertically spaced second grippers while said motor parts are also gripped by said first grippers and said first grippers are vertically spaced; and rotating said second grippers as a unit about a substantially vertical axis after said first grippers have released said motor parts in order to move said motor parts away from said first grippers.

17. The method defined in claim 16 wherein said processing step further comprises the step of:

moving said second grippers substantially horizontally in order to withdraw said motor parts from said first grippers prior to rotating said second grippers about said substantially vertical axis.

18. The method defined in claim 16 wherein said processing step further comprises the step of:

releasably gripping each of said at least two motor parts with a respective one of a plurality of vertically spaced third grippers while said motor parts are also gripped by said second grippers and after said second grippers have been rotated.

19. The method defined in claim 18 wherein said processing step further comprises the step of:

moving said second grippers substantially horizontally in order to insert said motor parts in said third grippers after rotating said second grippers.

20. The method defined in claim 18 wherein said processing step further comprises the step of:

operating on said motor parts while said motor parts are gripped by said third grippers in order to modify said motor parts.

* * * * *